United States Patent [19]

King

[11] Patent Number: 4,900,567

[45] Date of Patent: Feb. 13, 1990

[54] PROCESS FOR PREPARING A CEREAL

[75] Inventor: Arvid D. King, Lakeville, Minn.

[73] Assignee: CPC International Inc., Englewood Cliffs, N.J.

[21] Appl. No.: 295,851

[22] Filed: Jan. 11, 1989

Related U.S. Application Data

[63] Continuation-in-part of Ser. No. 23,568, Mar. 9, 1987.

[51] Int. Cl.$^4$ .......................... A23L 1/08; A23L 1/182
[52] U.S. Cl. ....................................... 426/93; 426/103; 426/309; 426/460; 426/620
[58] Field of Search ................. 426/93, 302, 309, 103, 426/460, 620

[56] References Cited

U.S. PATENT DOCUMENTS

| | | | |
|---|---|---|---|
| 1,167,127 | 1/1916 | Speare | 426/93 |
| 2,788,277 | 4/1957 | Huber | 426/93 |
| 2,868,647 | 1/1959 | Vollink | 426/302 |
| 3,723,131 | 3/1973 | Bixby et al. | 426/302 |
| 3,966,384 | 12/1976 | Reesman et al. | 426/96 |
| 4,089,984 | 5/1978 | Gilbertson | 426/293 |
| 4,522,833 | 9/1985 | Sharma | 426/93 |

*Primary Examiner*—Donald E. Czaja
*Assistant Examiner*—Helen Pratt

[57] ABSTRACT

A process for impregnating a grain cereal with honey. The honey is added to the grain cereal under specified conditions of oven temperature, rate of air flow through the oven, residence time in the oven, and cooling. The process correlates the maximum amount of honey to be added to the grain cereal with the type of grain cereal used.

10 Claims, No Drawings

PROCESS FOR PREPARING A CEREAL

CROSS REFERENCE TO RELATED APPLICATIONS

This application is a continuation-in-part of application Ser. No. 07/023,568 filed Mar. 9, 1987.

BACKGROUND OF THE INVENTION

1. Field of the Invention

This invention relates to a process for preparing a grain cereal impregnated with honey.

2. Description of the Related Art

There are a number of already-existing processes for preparing cereals coated with sweeteners. For example, Vollink, U.S. Pat. No. 2,868,647 discloses a process for making a cereal having a hard transparent glaze consisting of sucrose syrup containing controlled amounts of other sugars. The process involves coating ready-to-eat cereal bodies in flaked, shredded, puffed or other forms.

U.S. Pat. No. 4,089,984 to Gilbertson describes a method of preparing a ready to eat breakfast cereal coated with a liquid sweetener such as honey, corn syrup, or both. The method requires coating ready to eat cereals with sweetener followed by dusting with an edible powder (e.g. dextrose). The dusting step is required to prevent the coated pieces from sticking together.

Reesman et al. U.S. Pat. No. 3,996,384 describes a process for steeping and cracking triticale (a cross between wheat and rye) in water until a sufficient amount of water has been absorbed. The grains are sprayed with or immersed in a sweetening agent, which both coats and enters the grain. The product is gelatinized by cooking and is then hydrated. The product is then cooled, dried, flaked and toasted, with a resulting moisture content of, typically, 12–18%.

Bixby et al. U.S. Pat. No. 3,723,131 relates to a process for preparing a peanut-butter-containing cereal. The process consists of drying a cereal base to, preferably 4–8% moisture, permeating it with liquid peanut butter, and drying the resulting product to a 1–5% moisture level.

Huber U.S. Pat. No. 2,788,277 relates to a grain cereal base coated with a sweet syrup and sprinkled with cereal flakes. Huber is primarily directed to the appearance of the product.

It has now been found that grain cereals can be impregnated with honey under specific processing conditions. The product is flavorful, non-sticky and free-flowing.

SUMMARY OF THE INVENTION

The present invention is directed to a process for preparing a grain cereal impregnated with honey. According to the invention, a starch-containing grain cereal is enrobed with honey to form an enrobed intermediate. The enrobed intermediate is then heated in an oven at a temperature which will cause (1) the grain cereal to swell and give off moisture and (2) the honey to seep into the pores of the grain cereal; thereby impregnating it with the honey. The time of heating must be sufficient to allow impregnation of the grain cereal without damaging the end product.

In the process of the invention, the grain cereal must reach a temperature which is high enough to cause swelling and moisture release, but must not reach a temperature that would cause burning or other damage. The honey, moreover, must not reach its temperature of caramelization. Thus, the optimum temperature and time will vary with the combinations of grain cereal and honey which are used in accordance with the invention.

During heating, air is blown over the enrobed intermediate at a rate sufficient to remove moisture without blowing the enrobed intermediate away. In a preferred embodiment, the rate of air flow should be sufficient to cause a gentle rolling of the enrobed intermediate on the conveyor in a first oven chamber. The material leaving the first oven chamber shall be referred to hereinafter as the impregnated intermediate.

The impregnated intermediate is cooled in, for example, a second oven chamber.

The characteristics of the grain will determine the amount of honey that can be absorbed. Wheat and rice, for example, will absorb more honey than corn. This is because corn contains dextrose which partially fills the pores in the grain during heating, thereby leaving less room for the honey. Excess honey used in the process of the present invention will simply run off the grain cereal. Thus, one skilled in the art can easily determine the maximum amount of honey that will be absorbed by a particular grain. In embodiments where a weaker honey flavor is desired, smaller amounts of honey can be used.

When one skilled in the art follows the foregoing processing guidelines, a product will be produced which is impregnated with honey. The product will have acceptable flavor, will not be sticky, and will flow freely. As a result, the product of the present invention is not only of satisfactory flavor but may be processed by high speed packaging lines and will be easily handled by the consumer.

Unlike prior work in the field, the present invention recognizes the critical nature of certain aspects of grain cereals and honeys. Because of the hygroscopic nature of honey, for example, honey added to a grain cereal will withdraw moisture from the grain cereal, retain it, and, as a result, agglomerate in the package. To avoid such agglomeration, the present invention provides a means for determining the optimum conditions of oven temperature, rate of air flow, residence time in the oven and cooling. The present invention also recognizes that there is a correlation between the natural sugars in the grain cereal and the amount of honey the grain cereal will absorb. Consequently, a means is provided for determining the maximum amount of honey which may be added to various types of grain cereal in order to achieve a satisfactory product.

DESCRIPTION OF THE PREFERRED EMBODIMENTS

According to the present invention, grain cereals having a moisture content of from about 4 to about 5% are used as starting materials. Such grain cereals can be prepared by moistening or drying with conventional means or can be purchased commercially. It has been found that any starch-containing grain cereal may be used according to this invention.

The honey is admixed with the grain cereal in a conventional enrobing machine. Enrobing may be carried out at ambient temperature as long as the temperature of the honey is adjusted to provide a viscosity which allows it to be manipulated by the enrobing machine. The amount of honey to be added depends upon the desired flavor characteristics of the product of the invention and, as is described in the following examples, the maximum amount used depends upon the particular grain cereal to which it is added. For example, wheat and rice grain cereals are able to accept a higher amount of honey than is corn. It has been found that the dextrose naturally present in corn cereal swells when heated, thereby closing some of the pores to the honey. In general, it has been found that corn cereal will accept a maximum of from about 23 (twenty-three) to about 25 (twenty-five) percent by weight honey, whereas rice and wheat cereals will accept a maximum of from about 28 (twenty-eight) to about 32 (thirty-two) percent. (All percentages are by weight and refer to the total weight of the enrobed intermediate prior to the heating step.) It has also been found that any type of readily available honey may be used, depending upon desired flavor.

After enrobing, the moisture content of the enrobed intermediate is generally from about 5 to about 15%.

The enrobed intermediate is placed in a two-chambered drying oven wherein the first chamber is used for heating and the second for cooling. The chambers are generally connected end to end. A single conveyor belt can be used to carry the intermediates through the chambers.

The heating step is conducted in the first chamber which is maintained at a temperature sufficient to make the grain cereal open and admit the honey, but not caramelize the honey and thereby adversely affect the flavor, aroma and flowability of the product. Depending upon the type of grain and honey utilized, the heating temperature will be from about 255° to about 265° F.

When clover honey was used, the optimum oven temperature for corn, rice and wheat cereals was found to be about 260° F.±5°. This was in a first chamber having a length of 15 feet. The residence time in the first chamber of the enrobed intermediate mixture was about 6.5±0.5 minutes. Residence times for the various grain-honey combinations contemplated by the invention are from about 5 to about 7 minutes.

At the optimum temperature, it was found that only the moisture, and not sugar or flavor, was removed from the grain cereal. Below the optimum temperature it was found that the grain cereal did not emit moisture and, importantly, the honey itself did not emit moisture. If the honey does not emit moisture, which beads on the surface of the honey, then the moisture cannot be removed by the heated air in the oven which is caused to move over the enrobed intermediate. The result will be a sticky mass, which cannot be easily handled and will not flow.

The rate of air flow during heating is a critical, and heretofore unappreciated, aspect of the present invention. The rate of air flow is optimum when it causes the enrobed intermediate to rotate gently on the conveyor to provide uniform drying. This is easily observed by one skilled in the art. The optimum rate will vary with the size and configuration of the oven and the speed of the conveyor and can be from about 3 to about 5 cubic feet per minute. It was found in the embodiments described above that if the rate of air flow was below about 5 cubic feet per minute, the flow was insufficient to rotate the enrobed intermediate to provide uniform drying. Above that rate, the flow of air was so fast that it interrupted the process by blowing the enrobed intermediate along the conveyor or even off the conveyor.

During its residence in the first chamber, the moisture in the enrobed intermediate must be reduced so that the moisture content of the impregnated intermediate will be from about 4 to about 5%.

The impregnated intermediate is then passed into the second oven chamber. The second chamber is maintained at ambient temperature to provide for cooling. It has been found that the time required to cool the product and therefore the residence time in the second chamber is dependent upon ambient temperature and humidity. If ambient temperature and humidity are not satisfactory, the air may be conditioned (by heating, cooling or adjusting moisture content) before entering the chamber, or a second conveyor belt may be used in that chamber which is adjusted to a different speed from the belt in the first chamber. It was found in the embodiments described above that a residence time in a fifteen-foot cooling chamber of 6.5 minutes (achieved by a belt speed of 2.3 feet per minute) was adequate within normal ranges of temperature and humidity.

The precise cooling time is not critical to the present process and will therefore be governed by the equipment used, local ambient conditions and the like.

As a result of the above process, the moisture content of the product will be from about 4 to about 5%. It has been found that this reduction in moisture from about 5 to about 15% in the enrobed intermediate represents the moisture drop in the honey itself and that the moisture level of from about 4 to about 5% represents a critical range between the loss of moisture (desirable) and sugar (undesirable).

The following examples are given to illustrate further the present invention.

EXAMPLES

Example 1

Seventy-five pounds of puffed corn, purchased from a commercial source and containing 4–5% moisture, was placed in a Wenger 36–120 enrobing machine. Twenty-five pounds of clover honey was added, and the corn and honey were tumbled for approximately three minutes.

The enrobed intermediate was dropped onto a rubber belt and carried into a two-chambered Proctor-Swartz K-21488 oven, with a 30 (thirty) foot tunnel. The oven was equipped with a conventional spreading unit, which distributed the enrobed intermediate evenly over the belt. The belt, also conventional, was made of perforated steel and was 8 (eight) feet wide. The enrobed intermediate was distributed over the 6 (six) foot center of the belt at a depth of about 3 inches. At the stage at which the enrobed intermediate entered the first chamber of the oven, fifteen (15) feet in length, the moisture content was found to range from 12.5% to 13.8%. The oven temperature was maintained at 260°±5° F. The belt speed was 2.3 feet/minute which gave the enrobed intermediate a residence time of 6.5 minutes in the first chamber of the oven. The oven air at 260°±5° F., was blown over the enrobed intermediate at a rate of 5 (five) cubic feet per minute. As a result, the enrobed intermediate was gently agitated. After treatment in this chamber, the puffed corn was found to be impregnated with the honey.

The impregnated intermediate was then carried into the second oven chamber which was maintained at ambient conditions. This chamber was also fifteen feet long. The residence time was again 6.5 minutes which was achieved by a belt speed of 2.3 feet per minute. In the second chamber, the temperature of the impregnated intermediate dropped from 260° F. to ambient temperature. The sugar content of the product was determined at the end of the cooling process by a Bausch & Lomb refractometer and was found to be approximately 22.5%. It was also determined that the moisture content of the product was 4.3%.

The produce was found to have a pleasant aroma and taste reflecting both the corn and the honey. It was also found to be non-caramelized, with a satisfactory color, and it was non-agglomerative in that it would pour readily.

Example 2

Seventy pounds of puffed rice grains, purchased from a commercial source, and containing 4–5% moisture, was placed in a Wenger Model 36-120 enrobing machine. Thirty pounds of clover honey was added, and the rice and honey were tumbled for approximately three minutes.

The remainder of the process, as well as the observed results, were as described in Example 1. The product was tested and was found to have a pleasant aroma and taste reflecting both the rice and the honey. The product was non-caramelized, has satisfactory color, and poured readily.

Example 3

Seventy pounds of puffed rice grains, purchased from a commercial source, and containing 4–5% moisture, was placed in a Wenger Model 36-120 enrobing machine. Thirty pounds of clover honey was added, and the rice and honey were tumbled for approximately three minutes.

The remainder of the process as well as the observed results, were as described in Example 1. The product was tested and was found to have a pleasant aroma and taste reflecting both the wheat and the honey. It was non-caramelized, had a satisfactory color, and poured readily.

While the present invention has been described as above and in conjunction with specific preferred embodiments thereof, it will be understood that this description is intended to illustrate and not limit the scope of the invention, which is defined by the following claims.

What is claimed is:

1. A process for preparing a non-sticky, free-flowing grain cereal impregnated with honey, comprising:
   coating a quantity of starch-containing grain cereal containing from about 4 to about 5% moisture with honey up to the maximum amount of honey that will be absorbed by said grain cereal to make an enrobed intermediate;
   drying the enrobed intermediate at a temperature from about 255° to about 265° F. for about 5 to about 7 minutes while blowing air over said enrobed intermediate at from about 3 to about 5 cubic feet per minute to make an impregnated intermediate; and
   cooling said impregnated intermediate.

2. The process of claim 1 in which the grain cereal is made from corn.

3. The process of claim 1 in which the grain cereal is made from wheat.

4. The process of claim 1 in which the grain cereal is made from rice.

5. The process of claim 1 in which the grain cereal is made from triticale.

6. The process of claim 2 in which the amount of honey added is from about 23 to about 25 per cent by weight of the amount of grain cereal.

7. The process of claim 3 in which the amount of honey added is from about 28 to about 32 per cent by weight of the amount of grain cereal.

8. The process of claim 4 in which the amount of honey added is from about 28 to about 32 per cent by weight of the amount of grain cereal.

9. The process of claim 1 in which the impregnated intermediate is cooled under conditions of ambient temperature and humidity.

10. The process of claim 1 in which the grain cereal impregnated with honey contains from about 4 to about 5% moisture after cooling.

* * * * *